Nov. 25, 1924.
H. L. DUNCAN
1,516,810
SPEED INDICATOR RECORD DEVICE
Filed April 26, 1924
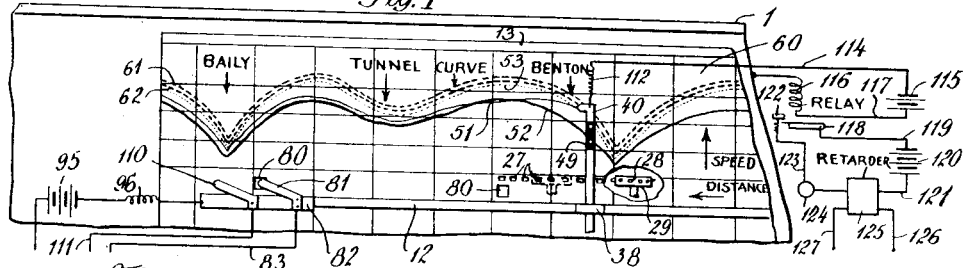
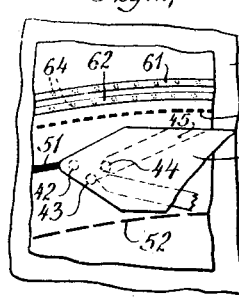 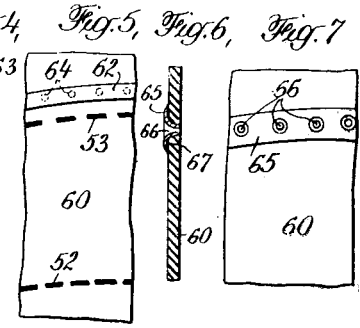
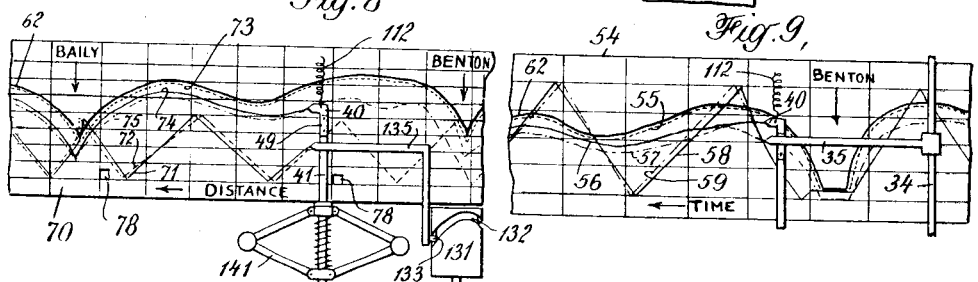
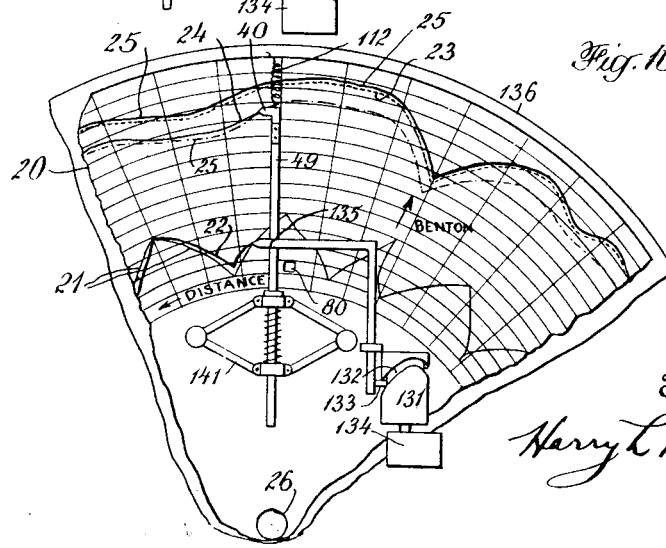
Inventor
Harry L. Duncan Patented Nov. 25, 1924.

1,516,810

UNITED STATES PATENT OFFICE.

HARRY L. DUNCAN, OF RIDGEWOOD, NEW JERSEY.

SPEED-INDICATOR RECORD DEVICE.

Application filed April 26, 1924. Serial No. 709,173.

*To all whom it may concern:*

Be it known that I, HARRY L. DUNCAN, a citizen of the United States, now residing at Ridgewood, Bergen County, New Jersey, have made certain new and useful Inventions Relating to Speed-Indicator Record Devices, of which the following is a specification, taken in connection with the accompanying drawings, which form part of the same.

This application is a continuation in part of my copending application Serial No. 137,446, renewed December 16, 1916, and originally filed March 11, 1913, as Serial No. 752,495, relating to speed and distance indicators and recorders; and my copending application Serial No. 525,613, filed December 29, 1921, relating to speed indicator record devices; that is, this case contains subject matter taken therefrom.

This invention relates to tape or other records for speed and distance indicators or recorders which are adapted for use on railroad or other vehicles making schedule runs. A compound or combined record may be arranged in connection with cooperating distance and time feeding or marking devices and with speed marking devices so as to form, on the tape or other form of record, indications or markings showing the travelled distance in connection with a previously formed distance schedule so as to directly compare the actual distance travelled with the scheduled distance for the same time. The speed indicating or marking devices also preferably form an indication or marking on an adjacent comparable portion of the record, thus recording the momentary speed of the vehicle throughout its run and furnishing valuable indications to the operator in connection with a previously formed speed schedule and also if desired route indications and a maximum allowable speed schedule for the corresponding portion of the route. It is also desirable to have the record provided adjacent to or superimposed on the maximum speed schedule with an emergency schedule such as emergency actuating means of any suitable character adapted to actuate electric, pneumatic or other emergency signals or devices from the maximum allowable speed for that part of the route is substantially exceeded. Such an emergency actuating schedule may be in the form of one or more lines or portions of different, that is, either greater or less electrical conductivity than the adjacent part of the record, and one or more rows of perforations and cooperating adhesive or other conducting material may be provided on the record allowing an electric contact, which may be arranged on or connected with the speed indicator, to open or close an emergency actuating circuit; or, if desired, the record may have thin foil or other metallic backing and a superimposed paper or other insulating face which may have its upper or outer edge, or one or more actuating schedule lines, for example, cut away or removed to thus form an emergency actuating edge or schedule. These records either in disc or tape or strip form may be advantageously formed of paper or other suitable flexible material which for cooperation with electrical emergency actuating devices, should preferably have at least an electrically insulating face or portion and in some cases a paper, celluloid or other cellulose ester or baked enamel composition coating may be formed on a flexible relatively conducting strip for this purpose. The emergency actuating means may be in the form of an actuating edge or one or more rows or lines of perforations in the record or, in some cases, may consist of lines or sections of electrically conductive material applied to or incorporated with the paper or other record so as to make electrical contact when the cooperating emergency devices or speed controlling means engages them. For this purpose strips or portions of metallic foil or metallic or other electrically conductive compositions of an adhesive character may be applied to or incorporated with the paper or other record and may more or less extend through perforations through the record where the electric circuit includes the backing plate on which the record is carried. In the case of distance feed records suitable resetting aligning apertures or other devices may be employed on the record cooperating with electric or other resetting mechanism to reset the record at suitable intervals in accurate alignment with track or route members cooperating with the passing vehicle so as to insure the substantial accuracy of the route indications on the record throughout the run of the vehicle.

In the accompanying drawing showing in a somewhat diagrammatic way several illustrative embodiments of this invention Fig. 1 shows a distance feed tape record having standard and maximum speed schedules with which the speed indication or marking may cooperate.

Fig. 2 is an enlarged front view of a portion of the record showing the cooperating speed indicator or maker.

Fig. 3 is a top view thereof.

Fig. 4 is an enlarged vertical section through another form of record.

Fig. 5 is an enlarged front view thereof.

Fig. 6 is an enlarged vertical section through still another form of illustrative record.

Fig. 7 is an enlarged front view thereof.

Fig. 8 shows a similar distance feed record having also a distance schedule with which a distance indication or marking may cooperate.

Fig. 9 shows a generally similar time feed record, and

Fig. 10 shows a distance feed disc record having standard and maximum speed schedules and a distance schedule with which the markings or indications cooperate.

The tape record 60 shown in Fig. 1 may be a distance feed record on which any suitable momentary or instantaneous speed marking or indication may be made by suitable mechanism. This tape record may be fed forward in proportion to the distance travelled by the vehicle by any desired feed devices, and may be arranged in a suitable indicator or recorder so as to have its edges supported and guided in the grooved guides 12, 13 as it is fed over a plate or other support 1 by the distance feed roll for instance, which it is unnecessary to indicate or describe in detail. The record may be to a considerable extent visible through a suitable opening or window in the casing or cover. A momentary speed marking may be made on this record by the speed marker 40 which may be of thin resilient silver or other suitable marking material to produce the desired marking on the clay loaded or other suitable paper forming the record. This speed marker may be operated by its connection with the speed marker rod 41 having square or other non-circular section and guided in the guide bearing 38; its lower end being moved longitudinally in proportion to the speed of the vehicle by any desired speed indicator device not shown. The speed marking thus made on the distance feed record indicates the momentary speed of the vehicle at that particular time and a suitable speed scale or indications may of course be formed on this record tape and graduated in miles per hour, or any other desired system of units. This record 60 is also preferably provided with a momentary speed schedule which may be printed or otherwise formed thereon in any desired way according to the observed or calculated speeds for a schedule run over the route in question. This standard speed schedule is shown as 52 and of course varies for different parts of the route, falling to zero at the stations where stops are made and otherwise varying in accordance with the grades, curves and other route conditions. It is also of advantage to have a maximum allowable speed schedule formed on such a record such as the line 53 which may with advantage be in the form of a heavy red line indicating a dangerous speed condition for that part of the route. The operator has thus before him at all times a visual indication of the relation of the momentary speed of the vehicle at that time to the schedule speed decided on as standard for that part of the route and also to the maximum allowable speed therefor, so that in case it is necessary or desirable to make up time the speed of the vehicle can be increased so that the marker is brought up above the speed schedule line 52 and makes the actual speed marking 51 between this line and the maximum allowable speed schedule marking 53 as shown in Fig. 1. It is also of advantage to have such a record carry suitable route indications such as the names of the various stations or stops and some at least of the more important features of the route, such as tunnels or curves in the case of railroads, or special grades or the like in the case of automobile busses or other vehicles making quite regular runs over a definite route. It is of advantage to provide in connection with this speed record a suitable record or indication of the distance travelled by the vehicle preferably in connection with the scheduled distance for the same time, so that the operator can thus see the amount that the train or vehicle is behind or ahead of the scheduled distance at any time; and then by referring to the adjacent momentary speed marking on the record 60 can see how the speed of the vehicle compares with the scheduled and maximum allowable speed for that part of the route and regulate running conditions accordingly.

In the case of long railroad runs, for example, especially where there are many curves, it is desirable to maintain the alignment of the distance feed tape or other record as by the use of record resetting aligning devices operated or controlled by track or route numbers which may be located at suitable intervals along the track or otherwise cooperate with the vehicle in any way.

For this purpose, the distance feed record may be formed with any suitable aligning devices which may control the definite, or substantial resetting of the record at that point in connection with the corresponding route member so as to insure the accurate alignment of the distance record with the corresponding portion of the route travelled at any desired intervals of a mile or any fraction or multiple thereof apart. For this purpose the distance record 60 may, for example, be provided with aligning devices in the form of apertures 80 punched or otherwise formed therein at the desired distances apart corresponding to distance intervals of a mile or so, for example, and cooperating stop members such as the electric contact member 81 may cooperate therewith, so that when each aligning device or aperture comes under the stop member the paper record no longer prevents this stop member from making electrical contact with the metallic record support or plate for example. This stop member may be conveniently mounted on an insulating block 82 and be connected by the wire 83 with any suitable stop device. To allow for any reasonable amount of wheel slip or other irregularity in the vehicle driving connections or record feeding mechanism it is desirable to have the feeding devices so proportioned as to normally overfeed the record tape to the extent of a few per cent or so, thus bringing each aligning aperture in the record into its aligned position in connection with the stop member a little before the vehicle comes into cooperation with the corresponding route member which may release the stopping device and restart or restore the normal operation of the record feeding mechanism in any desired way. A suitable controller releasing member or electric contact 110 may also be provided so as to cooperate with the aligning aperture 80 after the distance tape has moved forward to the desired extent, so that under these circumstances a current from a battery passes through the record support and through this contact member 110 and wire 111 so as to restore to normal position the mechanism cooperating with the route members. It is of course understood that the contact members 80 and 110 preferably have their tips or extreme ends which cooperate therewith bent back slightly away from the record support plate so that in case the locomotive or other vehicle moves backward for switching or the like these contacts will then properly disengage themselves from any aligning apertures 80 in the record tape 60.

For many purposes it is desirable to have an emergency actuating schedule formed on the paper or other flexible record 60 which preferably has an electrically insulating face or portion. Such emergency actuating means may be of any suitable character to cooperate with the speed indicator 40 or other speed actuated member of the emergency devices. It is, of course, advantageous to have a single speed indicator or marker which not only indicates the relation of the speed of the train or other vehicle to the standard or scheduled speed for that part of the route, but also indicates the relation of the actual speed to the maximum allowable speed and to the emergency actuating schedule or excessive speed at which the various emergency devices such as signal lamps or suitable emergency signals, emergency brakes, or power cut off devices are set in operation. As illustrated in Figs. 1 and 2, the emergency actuating schedule may comprise one or more rows of perforations 64, formed in the record 60 adjacent and preferably slightly above the maximum allowable speed schedule or line 53. As is shown in Fig. 4, one or more lines, strips or portions of adhesive composition, preferably of a distinctively electrically conductive material comprising, for instance, considerable proportions of powdered or precipitated copper, silver or graphite, etc. may be applied to one or both sides of the record strip and forced into or through such perforations 64 so as to form one or more such emergency actuating schedule lines or strips 61, 62 which may coincide with or preferably be slightly above the maximum allowable speed schedule line 53. By having such electrically conductive adhesive material forced through perforations to form interlocking portions within these record perforations or apertures a rear line or portion of such conductive material such as 63 may thus engage the backing plate or support on which the record operates and render it unnecessary to have the emergency actuating circuit include any of the feed rolls or other devices engaging the face of the record in order to make electrical contact with the emergency actuating schedule lines thereon. The speed indicator or marker 40 may for this purpose form part of an emergency actuating circuit and may have an insulating portion 49 adjacent the operating end of the marker or indicator which engages the record and may be connected by the spiral or flexible wire 112 and connector 114 to the battery 115 connected as by the wire 117 to the emergency relay coil 116 which is connected to the backing plate 1 of brass or other metal over which the record is fed forward. This marker, as shown more in detail in Figs. 2 and 3, may advantageously be arranged with a series of actuating contacts each of which is preferably rounded or spherical in character at the point where it engages the record. The main contact 42 which may be the marking contact normally producing the actual speed record line 51 because this marking contact is made of silver or such other metal or material as to produce a visible mark in connection with the clay or other loading or facing which may be used on the paper or other record. The auxiliary actuating contacts 43, 44 may be made, if desired, of different metal so as not to make a visible or similar marking on the record and may be mounted on light springs 45, 46 soldered or otherwise secured to the indicator or marker 40 so that these series of markers are all independently spring pressed against the record and any one of them is adapted to engage one of the electrically conductive actuating perforations or schedules 61, 62 sufficiently to make electrical contact therewith and thus with the metallic backing plate 1 beneath, the size of these actuating schedule lines being so regulated with respect to the thickness of the record 60 and the size of the marker or speed indicator contacts as to enable these contacts to make definite electrical contact therewith and to slide up on or over the actuating schedule lines or portions without tearing or injuring the record under operating conditions, the size of the marking contacts and the thickness of the schedules and paper record being, of course, considerably exaggerated for the sake of clearness in Figs. 2, 3 and 4.

Thus when the speed of the train or other vehicle becomes excessive so as to reach or exceed the maximum allowable speed schedule line 53 for the particular part of the route, the speed indicator or other speed actuated device rises to such a point that one or more of its actuating contacts 42, 43 and 44 engage the conductive lines or portions of the record such as 61, 62 and complete the emergency actuating circuit which may, as indicated in Fig. 1, thus actuate the relay 116 and draw up its armature 118 so that it engages the electrical contact 122. This closes the emergency circuit through the wire 119 and battery or other source of electricity 120 which may include the wire 123 and emergency signal lamp or other emergency visual or audible signal device 124 which can thus be actuated in the driver's cab or at any other part of the train. In some cases it is desirable to include a retarder 125 in this emergency circuit so as to give a delayed signal or actuation to other emergency devices, such as brakes, power cut offs, etc. For this purpose a quick return electric retarding device of the general type shown in the Nolen Patent No. 948,738 of February 8, 1910 is desirable so that after a predetermined number of seconds, for instance, if the speed of the train or other vehicle has not then been restored to a normal or allowable amount so that the actuating contacts no longer engage the emergency actuating perforations or other means, the emergency circuit 126, 127, controlled by the retarder is energized so as to operate any desired form of emergency signals or devices anywhere on the vehicle or train. In some cases it is desirable to have definite vertical aligning means for the record, especially where the record has a cut off actuating edge so that it no longer has two parallel edges which can be conveniently guided by flanges or lateral guiding means. In such event a series of aligning perforations such as 27 may be made throughout the length of the record tape or strip and one or more vertical aligning wheels 29 having teeth or projections 28 so spaced as to engage these perforations, may extend upward or downward or in both directions against the record so as to practically prevent any undersirable vertical movement thereof. The emergency actuating schedule or means may comprise a single strip, line or portion of distinctively electrically insulating or conductive material applied to or incorporated with one or both sides of the record. As is shown in Figs. 4 and 5, such an electrically conductive composition of preferably adhesive character comprising for instance considerable proportions of powdered or precipitated copper, silver graphite, etc., may be applied to one or both sides of the record strip 60 of paper or other material so as to be superimposed on or form the maximum allowable speed schedule or preferably so as to be arranged adjacent this maximum allowable speed line 53. It is in some cases advantageous to have such an electrically conductive schedule line 62 applied to the exposed face of the record and to have interlocking portions of this material 64 extend through holes or apertures in the record itself to unite in some cases with a rear line or portion 63 of such conductive material which may thus engage the backing plate on which the record operates and render it unnecessary to have the emergency circuit include any of the rolls or other devices engaging the face of the record to make contact with the conductive emergency schedule line 62. In this case when any of the actuating contacts on the speed indicator or other speed actuated device reaches this emergency schedule line it makes electrical contact therewith so as to close the emergency actuating circuit which with the form of the device shown in Fig. 4 may include the backing plate so that such a record can be used, if desired, with the Fig. 1 apparatus. Figs. 6 and 7 show another arrangement in which a conductive or metallic strip 65 of flexible metal foil such as thin copper, tin or other suitable yieldable ductile metal may be adhesively or otherwise secured to the exposed face of the paper or other record 60 as by the interposed layer of any suitable adhesive 67. In some cases also this strip of metal foil may be interlocked or riveted to the paper or other flexible record by making a series of perforations 66 in the foil so as to force interlocking portions thereof into or through perforations in the paper which in some cases may be previously formed along the line of the emergency actuating schedule for the particular record desired.

For some purposes it is more convenient and desirable to have both the travelled distance and momentary speed markings on a single combined comparative record as shown in Fig. 8. This record tape 70 may be a distance feed record which is fed forward in proportion to the distance travelled by the vehicle and may be provided with suitable route indications of any kind and with suitable distance scales or indications. An oscillatory time distance marking may be made on this record by a time marker 135 having a connected cam follower 133 cooperating with a cam groove 132 in the time cam 131 which may be rotated by a clock mechanism 134. In this way the zig-zag marking 71 is made on the tape indicating the travelled distance in connection with a suitable time scale or indications showing the hours or fractions thereof by suitable horizontal lines in this part of the record. A similarly formed or computed distance schedule 72 is also printed or otherwise formed on the tape in connection therewith, so that the relation of the total distance travelled at any time can be visually compared with the corresponding scheduled distance. This may be readily done as indicated, since corresponding horizontal points on these two records or markings correspond to the same time. Thus the time marker 135 indicates that the vehicle is somewhat behind its schedule since the distance travelled is not quite as much as should have been travelled in this same time because the distance schedule line 72 indicates a greater travelled distance than has actually been passed over by the vehicle. The speed marker 40 shown as cooperating with this combined tape record may be actuated by mechanism similar to what has been already described in connection with Fig. 1 so as to make a momentary speed marking 74 on this record for direct comparison with the momentary speed schedule 75 and the maximum allowable speed schedule 73 which may be formed on the record in any desired way. This paper or other record may have applied to it any suitable form of emergency actuating means or schedule such for example as the electrically conductive schedule line 62 illustrated in this case as adjacent and slightly above the maximum allowable speed schedule line 73. The speed indicator or marker 40 may be formed with a similar insulating portion 49 and have its tip or indication portion connected by the flexible or spiral wire 112 with the other elements of the emergency actuating circuit; so that, whenever the speed of the train or other vehicle reaches this excessive speed for the part of the route in question, the speed indicator 40 engages this conductive schedule line 62 and thus closes the emergency actuating circuit so as to be capable of operating the emergency signals and devices described.

Another arrangement is shown in Fig. 9 in which the time feed record 54 is used which may be fed forward by a clock actuated feeding device similar to that used in connection with the record 60. This record 54 may be provided with suitable time indications in hours or fractions thereof which may be designated in any desired way and any suitable distance marker such as the oscillatory distance marker 35 on the marker rod 34 may cooperate with this record to form the zig-zag distance marking 58 thereon for direct comparison with the distance schedule line 59 which may be previously formed on the record. The speed marker 40 on the marker rod 41 may also cooperate with adjacent or comparable portions of this record, preferably in about the same transverse position so as to form a directly comparable momentary speed marking 56 thereon with which may be advantageously used a previously formed speed schedule 57 and maximum allowable speed schedule 55. Suitable route or station indications may also be formed on this record where the runs are made in approximately schedule time. A similar electrically conductive or other emergency actuating means or schedule line 62 may be used on this record 54 so as to cooperate with the electrically energized speed marker 40.

A combined distance record in disc form is indicated in Fig. 10, this record 20 being, if desired, provided with a center hole or aperture 26 to cooperate with the usual stud or retaining screw of the recorder, and the record may be arranged angularly around the periphery of this record as indicated, the distance scale lines becoming radial and the speed scale lines circumferential under these conditions. Such a record may also have suitable distance scale and route indications thereon and may be formed with an oscillatory time distance schedule 22 preferably inwardly or downwardly separated from the speed schedules for greater clearness, which is sometimes desirable with the other tape records especially where they comprise open perforations or projecting actuating schedules, the distance indication or marking 21 made by the oscillatory distance marker 135 cooperates with the distance schedule 26 as indicated, this marker being actuated if desired by the devices described in connection with Fig. 8. The record may also, if desired, have a suitable standard speed schedule 25 and maximum speed schedule 23 indicating the scheduled and maximum allowable speeds for the vehicle at various parts of the route and a momentary speed indication or marking 24 may cooperate with these schedules so as to indicate the actual momentary speed of the vehicle at the corresponding part of the route. This marking may as indicated be made by the marker 40 actuated as above described in connection with Fig. 8. In this case the record 20 may be formed with an electrically conductive emergency actuating line or schedule 25 coinciding with or preferably adjacent the maximum allowable speed schedule line 23. It is thus apparent that when the speed indicator or marker 40 which may be electrically energized by the wire 112 and have an insulating section 49, if desired, rises substantially above this maximum allowable speed 23 for the particular part of the route, the speed marker which is normally in light engagement with this paper or other non-conducting record will then engage the electrically conductive schedule line 25 so as to make electrical contact with the backing plate 136 on which the record may be mounted. This plate may be included in the emergency actuating circuit such as described in connection with Fig. 1, so that as soon as the speed marker electrically connects with the plate the desired emergency signals or devices may be put in operation. In some cases it is also desirable to provide suitable regularly spaced perforated or other aligning devices 80 in the record for cooperation with aligning devices controlling the feed of the record and periodically aligning it in connection with correspondingly spaced members along the route of the vehicle.

Having described this invention in connection with a number of illustrative forms, proportions, materials, parts, devices and arrangements, to the details of which disclosure the invention is not of course limited, what is claimed as new and what is desired to be secured by Letters Patent is set forth in the appended claims.

1. The distance feed record, adapted to cooperate with the feed device of a speed or distance indicator or recorder, and having on adjacent comparable parts of the record route indications, and an electrically conductive emergency actuating schedule, and a cooperating emergency actuating circuit including an actual speed indicator indicating in connection with the record the corresponding actual momentary speed of the vehicle and having a contact engaging said record to effect an emergency actuation when the speed becomes excessive at any part of the route and brings said contact into engagement with said actuating schedule.

2. The distance feed record, adapted to cooperate with the feed device of a speed or distance indicator or recorder, and having on the record an electrically conductive emergency actuating schedule and a cooperating speed actuated electric contact operating speed actuated electric contact member engaging said actuating schedule on the record to effect an emergency actuation when the speed becomes excessive at any part of the route.

3. The distance feed record, adapted to cooperate with the feed device of a speed or distance indicator or recorder, and having on the record an indication of the scheduled distance to be travelled by the vehicle, route indications, and an emergency actuating schedule having different electrical conductivity than the adjacent parts of the record, and a cooperating emergency actuating circuit including a speed actuated electric contact member engaging said actuating schedule in the record to effect an emergency actuation when the speed becomes excessive in any part of the route.

4. The record, adapted to cooperate with a speed or distance indicator or recorder, and having speed indications, and electrically conductive emergency actuating means and a cooperating actual speed indicator indicating on the record the actual momentary speed of the vehicle and adapted to cooperate with said means to effect an emergency actuation when the speed becomes excessive at any part of the route.

5. The distance feed record, adapted to cooperate with the feed device of a speed or distance indicator or recorder, and having on comparable parts of the record a distance schedule adapted to give an indication of the scheduled and actual distance travelled by the vehicle and electrically conductive emergency actuating means, and a cooperating speed actuated electrical contact adapted to cooperate with said means to effect an emergency actuation when the speed becomes excessive at any part of the route.

6. The distance feed, paper tape record, adapted to cooperate with the distance feed device of a speed or distance indicator or recorder, and having thereon route indications, and indications adapted to indicate the speed for the various parts of the route in connection with an actual speed indicator, and an electrically conductive emergency actuating schedule on said record adapted to cooperate with an electric emergency actuating circuit including said actual speed indicator and effect an emergency actuation when the speed of the vehicle becomes excessive at any part of the route.

7. The paper speed record, adapted to cooperate with a speed indicator or recorder of a vehicle, and having thereon route indications and electrically conductive emergency actuating means adapted to cooperate with an electric emergency actuating member controlled by the speed of the vehicle to engage said means and effect an emergency actuation when the speed of the vehicle becomes excessive at any part of the route.

8. The distance feed, paper tape record, adapted to cooperate with the distance feed device of a speed or distance indicator or recorder, and having thereon route indications including an electrically conductive adhesive emergency actuating schedule line including interlocking portions of said schedule line engaging perforations in said record and adapted to cooperate with an electric emergency actuating circuit including a speed indicating contact and effect an emergency actuation when the speed of the vehicle becomes excessive at any part of the route.

9. The distance feed paper record, adapted to cooperate with the distance feed device of a speed or distance indicator or recorder, and having thereon an electrically conductive emergency actuating schedule including interlocking portions of said schedule engaging perforations in said record and adapted to cooperate with an electric emergency actuating circuit including a speed indicating contact and effect an emergency actuation when the speed of the vehicle becomes excessive at any part of the route.

10. The insulating faced record, adapted to cooperate with an indicator or recorder, and having thereon an electrically conductive emergency actuating schedule line including interlocking portions of said schedule line extending through said record and engaging perforations in the face of said record and forming on the back of the record electrically conductive means electrically connected with said schedule line.

11. The insulating faced record, adapted to cooperate with a speed or distance indicator or recorder, and having thereon an electrically conductive actuating schedule adapted to cooperate with an electric emergency actuating circuit including a contact member to engage the actuating schedule.

12. The distance feed, paper faced tape record, adapted to cooperate with a speed or distance indicator or recorder, and having thereon an adhesively secured electrically conductive excessive speed actuating schedule line corresponding to an excessive speed for the various parts of the route and adapted to cooperate with an electric emergency actuating circuit including a contact member actuated in accordance with the actual speed of the vehicle.

13. The insulating faced tape record, adapted to cooperate with a speed or distance indicator or recorder, and having thereon an adhesively secured electrically conductive excessive speed actuating schedule corresponding to an excessive speed for the various parts of the route and adapted to cooperate with an electric emergency actuating circuit including a contact member actuated in accordance with the actual speed of the vehicle.

14. The distance feed, tape, record adapted to cooperate with a speed or distance indicator or recorder, and having thereon an excessive speed actuating schedule having a different electrical conductivity than the adjacent portions of the record and corresponding to an excessive speed for the various parts of the route and adapted to cooperate with an electric emergency actuating circuit including a contact member actuated in accordance with the actual speed of the vehicle.

15. The record, adapted to cooperate with an indicator or recorder, and having thereon an excessive speed actuating schedule having a different electrical conductivity than the adjacent portions of the record and adapted to cooperate with an electric emergency actuating circuit.

HARRY L. DUNCAN.